United States Patent
Beer

(10) Patent No.: US 12,442,923 B2
(45) Date of Patent: Oct. 14, 2025

(54) METHOD OF MEASURING A DISTANCE FROM A TARGET

(71) Applicant: AMS Sensors Asia PTE LTD., Singapore (SG)

(72) Inventor: Stephan Beer, Schaffhausen (CH)

(73) Assignee: AMS Sensors Asia PTE LTD., Singapore (SG)

(*) Notice: Subject to any disclaimer, the term of this patent is extended or adjusted under 35 U.S.C. 154(b) by 890 days.

(21) Appl. No.: 17/638,140

(22) PCT Filed: Jul. 30, 2020

(86) PCT No.: PCT/SG2020/050440
§ 371 (c)(1),
(2) Date: Feb. 24, 2022

(87) PCT Pub. No.: WO2021/050003
PCT Pub. Date: Mar. 18, 2021

(65) Prior Publication Data
US 2022/0206146 A1   Jun. 30, 2022

Related U.S. Application Data

(60) Provisional application No. 62/897,624, filed on Sep. 9, 2019.

(51) Int. Cl.
*G01S 17/10*   (2020.01)
*G01S 7/484*   (2006.01)
*G01S 17/894*  (2020.01)

(52) U.S. Cl.
CPC ............ *G01S 17/10* (2013.01); *G01S 7/484* (2013.01); *G01S 17/894* (2020.01)

(58) Field of Classification Search
CPC ........ G01S 17/10; G01S 7/484; G01S 17/894; G01S 7/4863
See application file for complete search history.

(56) References Cited

U.S. PATENT DOCUMENTS

| | | |
|---|---|---|
| 3,889,261 A | 6/1975 | Sirven |
| 4,649,389 A | 3/1987 | Taylor, Jr. et al. |

(Continued)

OTHER PUBLICATIONS

Dorrington A A et al: 11 Achieving sub-millimetre precision with a solid-state full-field heterodyning range imaging camera; Sub-millimetre precision with a heterodyning range imaging camera 11, Measurement Science and Technology, IOP, Bristol, GB, vol. 18, No. 9, Sep. 1, 2007 (Sep. 1, 2007), pp. 2809-2816.

(Continued)

*Primary Examiner* — Luke D Ratcliffe
*Assistant Examiner* — Joseph C Fritchman
(74) *Attorney, Agent, or Firm* — Viering, Jentschura & Partner mbB

(57) ABSTRACT

We disclose a method of measuring a distance to or from a target, the method comprising: operating an emitter to generate a first pulsed signal and a second pulsed signal in a field of view of the emitter in which a target may be present, the first pulsed signal having a first pulse frequency and the second pulsed signal having a second pulse frequency, the first pulse frequency being different from the second pulse frequency; operating a detector to detect signals for a pre-determined duration after said first pulsed signal is generated and for a pre-determined duration after said second pulsed signal is generated; storing said detected signals in a memory spanning a period of the first pulsed signal and a period of the second pulsed signal, respectively; using the detected signals to identify a portion of the first pulsed signal reflected by the target and a portion of the second pulsed signal reflected by the target; determining a first virtual distance based on a difference between a reference signal and the detection of the portion of the first pulsed signal reflected by the target; determining a second virtual distance based on a difference between the reference signal and the detection of the portion of the second pulsed signal (Continued)

reflected by the target; and determining the distance to the target based on a virtual difference corresponding to a difference between the first virtual distance and the second virtual distance.

19 Claims, 7 Drawing Sheets

(56) References Cited

U.S. PATENT DOCUMENTS

| | | | |
|---|---|---|---|
| 4,894,660 | A | 1/1990 | Thomson et al. |
| 5,148,178 | A | 9/1992 | Holzer et al. |
| 9,641,259 | B1 | 5/2017 | Charlantini et al. |
| 10,473,770 | B1 * | 11/2019 | Zhu ..................... G01S 17/931 |
| 10,571,570 | B1 * | 2/2020 | Paulsen .................. G01S 17/10 |
| 2010/0128247 | A1 | 5/2010 | Heizmann et al. |
| 2016/0209498 | A1 | 7/2016 | Reilly et al. |
| 2019/0250257 | A1 * | 8/2019 | Finkelstein .......... H04N 25/773 |
| 2022/0206158 | A1 * | 6/2022 | Henderson ............ G01S 7/4914 |

OTHER PUBLICATIONS

Chinese office action issued for the corresponding Chinese patent application No. 202080063120.X, dated Jul. 24, 2024, 10 pages (for informational purposes only).

Chinese office action issued for the Chinese patent application No. 202080063120.X, dated May 27, 2025, 6 pages (for informational purposes only).

* cited by examiner

METHOD OF MEASURING A DISTANCE FROM A TARGET

CROSS-REFERENCE TO RELATED APPLICATIONS

This application is a 371 U.S. National Phase of PCT International Patent Application No. PCT/SG2020/050440, filed on 30 Jul. 2020, which claims benefit and priority to U.S. provisional patent application No. 62/897,624, filed on 9 Sep. 2019; the disclosures of which are each incorporated by reference herein in their entirety for all purposes.

TECHNICAL FIELD OF THE DISCLOSURE

The disclosure relates to methods and apparatuses for measuring distances and/or obtaining distance data.

BACKGROUND OF THE DISCLOSURE

Time-of-Flight (ToF) based systems may be used to provide depth and/or distance information for two- or three-dimensional imaging or scanning.

ToF systems may be characterized by a maximum measurable distance, which may also be referred to as the maximum unambiguous range. In indirect ToF (iToF) systems, a continuous modulated signal is emitted and the phase difference between an outgoing and return signal is measured to determine the distance the signal travelled. Ambiguity can arise from the periodic nature of the modulated signal. For example, if the time delay causes a phase change larger than one complete period, a particular phase measurement may represent a number of possible distances. Each of the possible distances will be separated by multiples of one half of the wavelength of the modulation frequency.

The maximum unambiguous range is inversely proportional to the modulation frequency. As such, the maximum unambiguous range may be extended by lowering the modulation frequency. However, by lowering the modulation frequency, a distance precision is also lowered, which typically is not desired.

Dorrington et al 2007 *Meas. Sci. Technol.* 18 2809 describe a solid state range imaging system capable of capturing range and intensity data simultaneously for every pixel in a scene with sub-millimetre range precision. Dorrington et al describe a first distance measurement using a modulated signal having a modulation frequency of 100 MHz and a second distance measurement using a modulated signal having a modulation frequency of 93.75 MHz to determine the actual distance to a target. The use of the two modulation frequencies allows for an extension of the maximum unambiguous range. However, this method only permits a certain distance precision for each measurement, which decreases with increasing distance. The distance precision may also be limited to the available optical power of the light sources and/or an integration time of the detectors used for the distance measurement.

In direct ToF (dToF) systems, which employ discrete pulses, a maximum range is determined by a memory size (corresponding to a number of histogram bins and their respective bin width). For example, if a bin width of 200 ps is chosen (for precision reasons), this corresponds to 37.5 mm such that a range of 7.5 m requires a histogram size of 200 bins. As every bin needs a certain depth, this leads to a significant amount of memory being required for every pixel. For a three-dimensional camera having a large number of pixels, there is inevitably a trade-off between the memory size and the maximum detectable range. This is despite the fact that most bins will effectively be empty (or subject only to a background signal) due to the gap between pulses and the lack of reflected signals. Some solutions have been proposed to solve this such as spatial or time multiplexing, however, none of these approaches are entirely satisfactory.

It is therefore an aim of the present disclosure to provide methods, apparatuses and systems for measuring distances that address one or more of the problems above or at least provide a useful alternative.

SUMMARY

In general, the disclosure proposes to address one or more of the above problems by emitting a first pulsed signal comprising a first pulse frequency and a second pulsed signal comprising a second pulse frequency towards a target in a field of view of an emitter, wherein the first pulse frequency is different from the second pulse frequency. For each frequency, a memory or histogram spanning only a period of that frequency is used to save memory, such that the reflected signals are folded back into this period. In this way, first and second virtual distances are determined using the reflected portions of the first and second pulsed signals and the distance to the target is based on a virtual difference between the first virtual distance and the second virtual distance.

According to a first aspect of the present disclosure a method for measuring a distance to a target comprises:

operating an emitter to generate a first pulsed signal and a second pulsed signal in a field of view of the emitter in which a target may be present, the first pulsed signal having a first pulse frequency and the second pulsed signal having a second pulse frequency, the first pulse frequency being different from the second pulse frequency;

operating a detector to detect signals for a pre-determined duration after said first pulsed signal is generated and for a pre-determined duration after said second pulsed signal is generated;

storing said detected signals in a memory spanning a period of the first pulsed signal and a period of the second pulsed signal, respectively;

using the detected signals to identify a portion of the first pulsed signal reflected by the target and a portion of the second pulsed signal reflected by the target;

determining a first virtual distance based on a difference between a reference signal and the detection of the portion of the first pulsed signal reflected by the target;

determining a second virtual distance based on a difference between the reference signal and the detection of the portion of the second pulsed signal reflected by the target; and determining the distance to the target based on a virtual difference corresponding to a difference between the first virtual distance and the second virtual distance.

Thus, according to the first aspect, a method for measuring a distance to a target is provided which folds all signals into one period to as to save memory, whilst allowing the real distance to be determined by using two different pulsed frequency signals and a difference between the two virtual distances. Advantageously, the unambiguous range can be extended using this method up to a distance at which the target reflectance is indistinguishable from background levels.

Notably, each pulsed signal does not include a time stamp and therefore without synchronisation there is no way of determining which signal pulse has been reflected and is received at any point in time using a single pulsed signal. However, as the present method employs two different pulsed signals (each having a different frequency and therefore period), it is possible to determine the real distance that each signal as travelled using the virtual difference between them in the measured period.

The detector may be configured with a time to digital converter TDC that generates a histogram spanning one period for each frequency. The acquisition of data using the TDC may be repetitive (i.e. at a same frequency as the period) and/or accumulative.

The step of determining the distance to the target may comprise determining a period difference corresponding to a difference between the period of the first pulsed signal and the period of the second pulsed signal.

The step of determining the distance to the target may comprise determining a period weighting based on the virtual difference and the period difference, multiplying the period weighting by the period of the first pulsed signal and adding the first virtual distance.

The step of determining the distance to the target may comprise determining a period weighting based on the virtual difference and the period difference, multiplying the period weighting by the period of the second pulsed signal and adding the second virtual distance.

The memory may comprise a number of bins spanning the period of the first pulsed signal and the period of the second pulsed signal, respectively, and wherein each bin stores a value representing the signal detected in a pre-defined measurement window corresponding to a pre-defined distance or time.

The pre-defined measurement window of each bin may correspond to the period difference; a fraction of the period difference or a factor of the period difference.

The first virtual distance may be determined by calculating the number of bins separating a reference bin comprising a detected signal corresponding to the reference signal (e.g. peak) and a signal bin comprising a detected signal corresponding to the portion (e.g. peak) of the first pulsed signal reflected by the target and the second virtual distance may be determined by calculating the number of bins separating the reference bin comprising the detected signal corresponding to the reference signal (e.g. peak) and the signal bin comprising the detected signal corresponding to the portion (e.g. peak) of the second pulsed signal reflected by the target.

The distance can be determined to a resolution that is far better than just a bin width, i.e. the difference between the reference peak and the reflected signal peak can be determined to a fraction of bin width (e.g. if the bin width=250 ps corresponding to ~37.5 mm and the target is at 500 mm, the difference between the reflected signal peak and the reference peak is 500 mm/37.5 mm/bin=13.33 bins).

The method may further comprise:
operating the emitter to generate a third pulsed signal in the field of view of the emitter in which the target may be present, the third pulsed signal having a third pulse frequency, the third pulse frequency being different from the first pulse frequency and the second pulse frequency;
operating the detector to detect signals for a pre-determined duration after said third pulsed signal is generated;
storing said detected signals in a memory spanning a period of the third pulsed signal;
using the detected signals to identify a portion of the third pulsed signal reflected by the target;
determining at least two of the first virtual distance, the second virtual distance and a third virtual distance, the third virtual distance being based on a difference between the reference signal and the detection of the portion of the third pulsed signal reflected by the target; and
determining the distance to the target based on a virtual difference corresponding to a difference between the at least two of the first virtual distance, the second virtual distance and the third virtual distance.

Using a third pulsed signal can help to overcome a problem when one of the reflected signals is folded on top of and becomes indistinguishable from the reference signal.

The method may comprise operating the emitter to successively generate the first pulsed signal, the second pulsed signal and the third pulsed signal.

The step of determining at least two of the first virtual distance, the second virtual distance and the third virtual distance may comprise selecting at least two of the first virtual distance, the second virtual distance and the third virtual distance based on one or more of:
a value and/or profile of the detected signal corresponding to the reference signal;
a value and/or profile of the detected signal corresponding to the portion of the first pulsed signal reflected by the target;
a value and/or profile of the detected signal corresponding to the portion of the second pulsed signal reflected by the target; and
a value and/or profile of the detected signal corresponding to the portion of the third pulsed signal reflected by the target.

The third virtual distance may be determined by calculating a number of memory bins separating a reference bin comprising the detected signal corresponding to the reference signal and a signal bin comprising the detected signal corresponding to the portion of the third pulsed signal reflected by the target.

The step of determining the distance to the target may comprise determining a period difference between at least two of the period of the first pulsed signal, the period of the second pulsed signal and the period of the third pulsed signal.

The step of determining the distance to the target may comprise determining a period weighting based on the virtual difference and the period difference, and at least one of:
multiplying the period weighting by the period of the first pulsed signal and adding the first virtual distance;
multiplying the period weighting by the period of the second pulsed signal and adding the second virtual distance; and
multiplying the period weighting by the period of the third pulsed signal and adding the third virtual distance.

The reference signal may be one of: an initiation signal; a synchronisation signal; a signal stored in a first memory bin; a cover glass reflectance; or a cross-talk signal.

In some embodiments, the reference signal may be determined using a low pulse frequency. The reference signal may then be subtracted from all subsequent measurements.

According to a second aspect of the present disclosure, a computer program comprises computer readable instructions configured to cause a processor to carry out the method according to the first aspect.

According to a third aspect of the present disclosure, a non-transitory computer readable medium comprises a computer program according to the second aspect.

According to a fourth aspect of the present disclosure, an apparatus for measuring a distance to a target comprises:

an emitter having a field of view in which a target may be present, the emitter being configured to generate a first pulsed signal and a second pulsed signal in the field of view, the first pulsed signal having a first pulse frequency and the second pulsed signal having a second pulse frequency, the first pulse frequency being different from the second pulse frequency;

a detector configured to detect signals for a pre-determined duration after said first pulsed signal is generated and for a pre-determined duration after said second pulsed signal is generated; and a memory configured to store said detected signals, wherein the memory spans a period of the first pulsed signal and a period of the second pulsed signal, respectively; and a controller configured to:
- use the detected signals to identify a portion of the first pulsed signal reflected by the target and a portion of the second pulsed signal reflected by the target;
- determine a first virtual distance based on a difference between a reference signal and the detection of the portion of the first pulsed signal reflected by the target;
- determine a second virtual distance based on a difference between the reference signal and the detection of the portion of the second pulsed signal reflected by the target; and
- determine the distance to the target based on a virtual difference corresponding to a difference between the first virtual distance and the second virtual distance.

The detector may comprise an array of pixels, at least one or each pixel of the array of pixels being configured to detect signals corresponding to the portion of the first pulsed signal reflected by the target and/or the portion of the second pulsed signal reflected by the target.

The memory may comprise a number of bins and each bin is shared by multiple pixels of the array of pixels.

The memory may spans only the period of the first pulsed signal and/or only the period of the second pulsed signal, respectively.

It will be appreciated that any features described in relation to the first, second or third aspect may also apply to the apparatus according to the fourth aspect, and vice versa.

Compared to known distance measuring methods, the methods and apparatuses disclosed herein may have the following advantages:
1. A maximum unambiguous range is extended.
2. A precision of the distance measurement may be constant and/or independent of the distance to the target and/or the maximum unambiguous range extension.
3. Reduced memory size requirements, which may allow for a reduced footprint of the disclosed systems and/or apparatuses and/or a reduction in the costs for producing the disclosed systems and/or apparatuses.
4. Reduced memory size requirements may allow for increased memory space per pixel and/or an increased number of pixels working at the same time, and thus an increased performance of the disclosed systems and apparatuses.
5. Elimination of mixing or interference between a reference signal and a portion of the first, second and/or third pulsed signal reflected by the target.

BRIEF DESCRIPTION OF THE PREFERRED EMBODIMENTS

Some preferred embodiments of the disclosure will now be described by way of example only and with reference to the accompanying drawings, in which.

DETAILED DESCRIPTION OF THE PREFERRED EMBODIMENTS

Generally speaking, the disclosure provides methods, apparatuses and systems for measuring a distance to a target, which have a large unambiguous range, a small memory size requirement and/or can measure a distance to the target with a precision that remains constant and/or is independent of the distance to the target.

Some examples of the method and associated system and apparatus are given in the accompanying figures.

Figure 1:
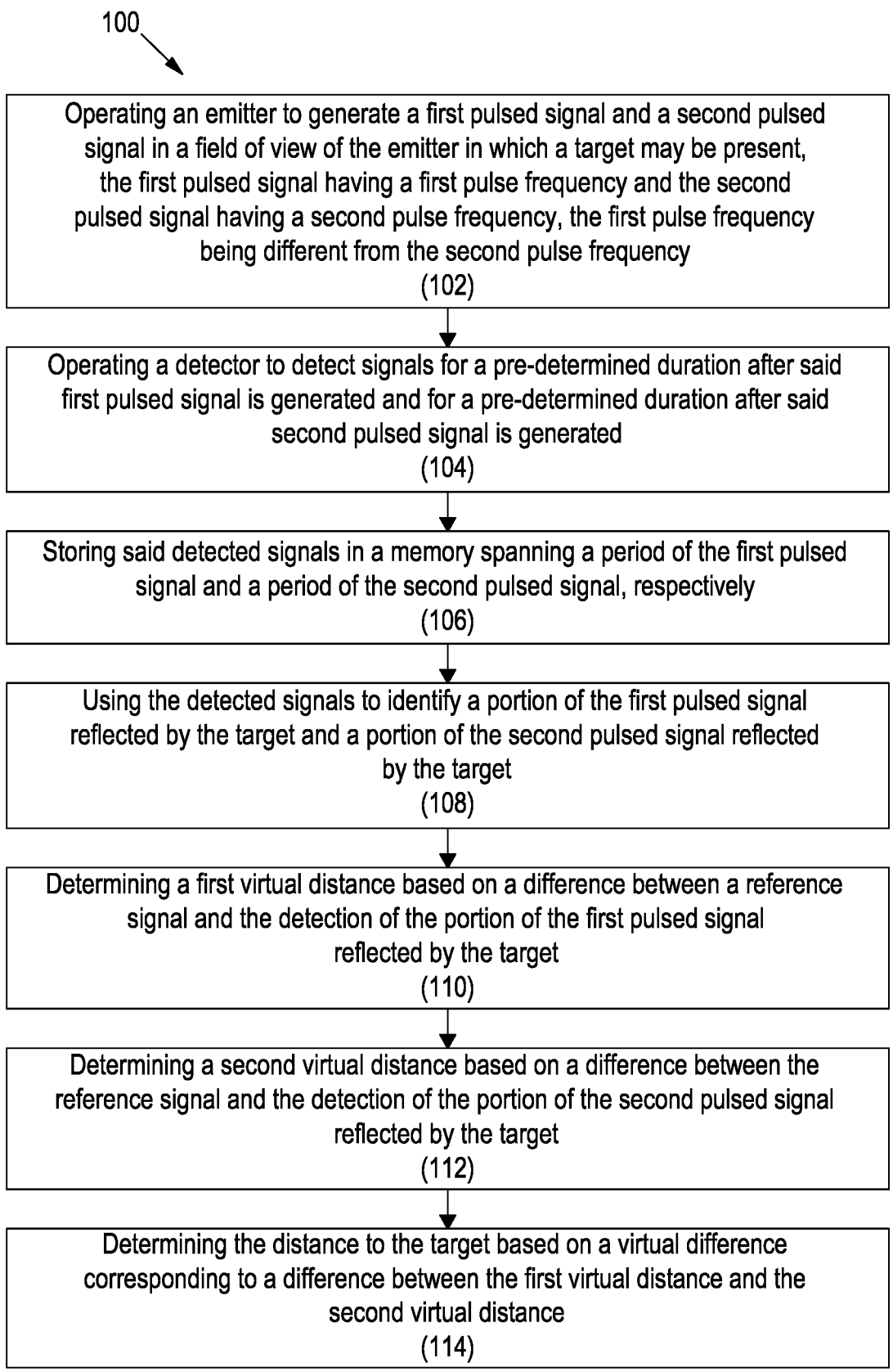
FIG. 1 shows a flow diagram outlining the steps of a method for measuring a distance to a target in accordance with embodiments of the present disclosure.

FIG. 1 shows an exemplary flow diagram of a method 100 for measuring a distance to a target in accordance with the present disclosure. The method 100 may be considered a direct time-of-flight method. In step 102, the method 100 comprises operating an emitter to generate a first pulsed signal and a second pulsed signal in a field of view of the emitter in which a target may be present. The first pulsed signal has a first pulse frequency and the second pulsed signal has a second pulse frequency, the first pulse frequency being different from the second pulse frequency.

In step 104, the method 100 comprises operating a detector to detect signals for a pre-determined duration after said first pulsed signal is generated and for a pre-determined duration after said second pulsed signal is generated.

In step 106, the method 100 comprises storing said detected signals in a memory spanning a period of the first pulsed signal and a period of the second pulsed signal, respectively.

In step 108, the method 100 comprises using the detected signals to identify a portion (e.g. peak) of the first pulsed signal reflected by the target and a portion (e.g. peak) of the second pulsed signal reflected by the target.

In step 110, the method 100 comprises determining a first virtual distance based on a difference between a reference signal and the detection of the portion of the first pulsed signal reflected by the target.

In step 112, the method 100 comprises determining a second virtual distance based on a difference between the reference signal and the detection of the portion of the second pulsed signal reflected by the target.

In step 114, the method 100 comprises determining the distance to the target based on a virtual difference corresponding to a difference between the first virtual distance and the second virtual distance.

In the present embodiment, the step of determining the distance to the target comprises determining a period difference corresponding to a difference between the period of the first pulsed signal and the period of the second pulsed signal; determining a period weighting based on the virtual difference and the period difference; and multiplying the period weighting by the period of the first pulsed signal and adding the first virtual distance. In other embodiments, the period weighting may be multiplied by the period of the second pulsed signal and the second virtual distance added to determine the distance to the target.

Figure 2:
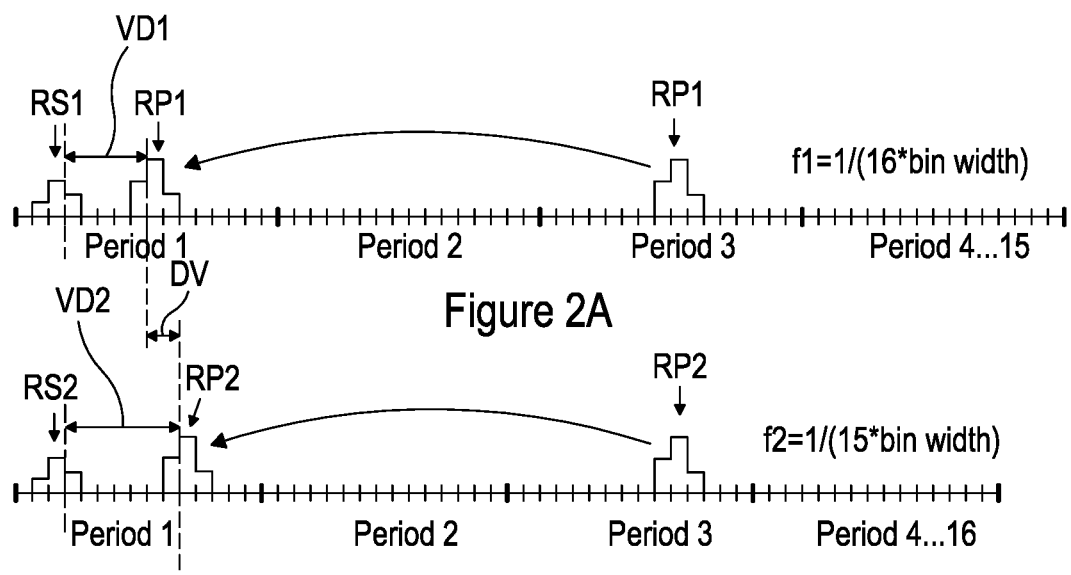
FIG. 2A shows a number of first histograms, each first histogram corresponding to a period of a first pulsed signal generated as part of the method of FIG. 1.
FIG. 2B shows a number of second histograms, each second histogram corresponding to a period of a second pulsed signal generated as part of the method of FIG. 1.

In the present embodiment, the detector comprises a time to digital converter TDC that generates a histogram spanning one period for each frequency and stores the detected values in the memory. The acquisition of data using the TDC is therefore repetitive at a same frequency as the period such that one period of data is kept in memory at any point in time. However, for illustrative purposes FIGS. 2A and 2B show a number of successive histograms as recorded, respectively, for each of the first and second pulsed signals. Thus, the reflected portions of the first pulsed signal and the second pulsed signal are recorded in a histogram. FIG. 2A shows a number of first histograms. Each first histogram shown in FIG. 2A corresponds to a period of the first pulsed signal. FIG. 2B shows a number of second histograms. Each second histogram shown in FIG. 2B corresponds to a period of the second pulsed signal. Each first histogram and each second histogram comprises a number of bins.

The first pulse frequency f1 and/or the second pulse frequency f2 may be selected based on a desired size of a memory. The memory may be required to store one of the first and second histograms, spanning only one period of the first and second pulsed signals, respectively. As such, by increasing the first pulse frequency f1 and/or the second pulse frequency f2, the period of the first pulsed signal and/or the second pulsed signal may be decreased, respectively, which may lead to a decrease in size of the first and second histograms. As such, the size of the memory may be reduced further.

The first pulse frequency f1 and/or the second pulse frequency f2 may be larger than 100 to 200 MHz. The first pulse frequency f1 and/or the second pulse frequency f2 may be in the range of about 100 to 350 MHz. In this embodiment, the first pulse frequency f1 is 250 MHz and the second pulse frequency f2 is 266.6 MHz. It will be appreciated that in other embodiments, the first pulse frequency may be larger or smaller than 250 MHz and/or the second pulse frequency may be larger or smaller than 266.6 MHz. For example, in other embodiments, the first frequency may be about 125 MHz and/or the second frequency may be about 133.3 MHz.

Using a first pulse frequency f1 of 250 MHz and a pulse second frequency f2 of 266.6 MHz, the maximum unambiguous range can be calculated as about 9 m. In contrast, the maximum unambiguous range of a distance measurement using a single pulse frequency of 250 MHz or 266.6 MHz corresponds to about 0.6 m or 0.5625 m, respectively. As such, by using a first pulsed signal having a first pulse frequency and a second pulsed signal having a second pulse frequency, the maximum unambiguous range can be extended. At the same time, the first and second frequencies may be selected to be higher than the frequency of a single pulsed signal which may be used for a distance measurement, and this may reduce a required memory size, as will be described below.

In this embodiment, a pulse width of the first pulsed signal is the same as a pulse width of the second pulsed signal. For example, the pulse width of the first pulsed signal and the second pulsed signal may be in the range of 100 ps to 500 ps. It will be appreciated that in other embodiments the pulse width of the first pulsed signal may be different from the pulse width of the second pulsed signal.

A width of each bin of each first histogram and each second histogram may be selected based on a required precision of the method 100. In this embodiment, the width of each bin is 250 ps, which corresponds to c*250 ps/2=37.5 mm, where c is the speed of light. This results in 16 bins per period of the first pulsed signal and 15 bins per period of the second pulsed signal, as shown in FIGS. 2A and 2B. The first pulse frequency f1 and the second pulse frequency f2 may be selected such that there is at least a one bin difference between the period of the first pulsed signal and the period of the second pulsed signal. In other words, the difference between the periods of the first and second pulsed signals may be equal to one bin; to a fraction of a bin or to multiple bins. It will be appreciated that additionally or alternatively, the width of each bin of each first histogram and/or each second histogram may be selected based on a size of the memory, which may be used for storing one of the first and second histograms.

As explained above, the method 100 of determining the distance to the target comprises determining the first virtual distance to the target and the second virtual distance to the target.

The term "first virtual distance" may be considered as encompassing a first distance, which may or may not be the actual or correct distance to the target. This is because it can be uncertain as to which of the emitted pulses the detected reflected portion of the first signal belongs to or is associated with. The first virtual distance therefore comprises a distance that is determined within a period of the first pulsed signal when the reflected portion is folded back into the recorded period, which is labelled as Period 1 in FIG. 2A. The reflected portion of the first pulsed signal is recorded in the first histograms as a peak RP1.

The term "second virtual distance" may be considered as encompassing a second distance, which may or may not be the actual or correct distance to the target. This is because it can be uncertain as to which of the emitted pulses the detected reflected portion of the second signal belongs to or is associated with. The second virtual distance therefore comprises a distance that is determined within a period of the second pulsed signal when the reflected portion is folded back into the recorded period, which is labelled as Period 1 in FIG. 2B. The reflected portion of the second pulsed signal is recorded in the second histograms as a peak RP2.

The first virtual distance is determined by comparing the reflected portion of the first pulsed signal RP1 to a first reference signal RS1. The second virtual distance is determined by comparing the reflected portion of the second pulsed signal RP2 to a second reference signal RS2. The first and second reference signals RP1, RP2 may be considered to represent a zero-distance signal.

The first reference signal RS1 comprises another portion of the first pulsed signal reflected by a part of a system or apparatus comprising the emitter. The second reference signal RS2 comprises another portion of the second pulsed signal reflected by the same part of the system or apparatus comprising the emitter. For example, as will be described below, the emitter may be part of a camera system, such as for example a direct Time-of-Flight (dToF) camera system, or part of a sensor apparatus, such as for example a direct Time-of-Flight (dToF) sensor apparatus. The system or apparatus may comprise a cover portion, such as for example as a cover glass. The cover portion may be arranged at a distance from the emitter, as will be described below. The distance between the cover portion and the emitter is known.

The method 100 may comprise detecting the first reference signal RS1 and the second reference signal RS2. As the distance between the cover portion and the emitter is known, the first and second reference signals RS1, RS2 are set as the zero-distance signals. The first virtual distance VD1 is determined from the difference between the peak of the first reference signal RS1 and the peak of the reflected portion of the first pulsed signal RP1. In the example shown in FIG. 2A, the first virtual distance VD1 is 5 bins, which corresponds to 0.1875 m, e.g. five times the bin width of 37.5 mm. Similarly, the second virtual distance VD2 is determined from the difference between the peak of the second reference signal RS2 and the peak of the reflected portion of the second pulsed signal RP2. In the example shown in FIG. 2B, the second virtual distance VD2 is 7 bins, which corresponds to 0.2625 m, e.g. seven times the bin width of 37.5 mm. By using the first and second reference signals RS1, RS2 for the determination of the first and second virtual distances VD1, VD2, respectively, no synchronisation is required between the emission of the first and second pulsed signals and the detection of the reflected portions of the first and second pulsed signals, respectively.

The step of determining the distance to the target (step 114) comprises determining a virtual difference DV between the first virtual distance VD1 and the second virtual distance VD2, determining a period difference DP corresponding to a difference between the period of the first pulsed signal and the period of the second pulsed signal, determining a period weighting PW based on the virtual difference DV and the period difference DP, multiplying the period weighting PW by the period of the first pulsed signal (or second pulsed signal) and adding the first virtual distance (or second virtual distance).

For example, as described above, the first pulse frequency f1 and the second pulse frequency f2 are different. As such, the period of the first pulsed signal and the period of the second pulsed signal is different too. In this embodiment, the period of the first pulsed signal is 4 ns, which corresponds to 0.6 m or 16 bins. The period of the second pulsed signal is 3.75 ns, which corresponds to 0.5625 m or 15 bins.

As shown in FIGS. 2A and 2B, the difference between peaks RP1 and RP2 in Period 1 is two bins, which corresponds to the virtual difference between the first and second virtual distances VD1, VD2. It will be appreciated that in other embodiments, the virtual difference DV between the first and second virtual distances may be more or less two bins.

In this embodiment, there is a one bin difference between the period of the first pulsed signal and the period of the second pulsed signal. In other words, the period difference DP is equivalent to one bin and the virtual difference DV is equivalent to two bins. The period weighting PW is the virtual difference DV divided by the period difference DP which, in this case, is two. Multiplying the period weighting PW by the period of the first or second pulsed signals determines the actual distance to add onto the first virtual distance VD1 or second virtual distance to determine the real distance to the target. In the present embodiment, the actual distance is in Period 3 in FIGS. 2A and 2B, which is equivalent to Period 1 plus two periods determined by the virtual difference DV of two bins. The distance R to the target is therefore determined based on the actual distance to add onto the first virtual distance VD1 or second virtual distance VD2, such that the distance R is calculated by Equation (1) as follows:

$$R = PW*T1 + VD1 = PW*T2 + VD2 \qquad (1)$$

where T1 is the period of the first pulsed signal and T2 is the period of the second pulsed signal. In the example shown in FIGS. 2A and 2B, the distance R to the target can be calculated as 2*0.6 m+5*37.5 mm=2*0.5625+7*37.5 mm=1.3875 m.

The determination of the first virtual distance VD1 and the second virtual distance VD2 may require a certain precision in order to be able to determine the real distance R. The required precision may depend on a number of errors, e.g. false positive errors, that may be allowed in the determination of the first virtual distance VD1 and the second virtual distance VD2. For example, when 1% of errors are allowed, the required precision may be determined as 0.5*1 bin. Expressed differently, the precision in the determination of the first virtual distance VD1 and the second virtual distance VD2 needs to be smaller than a difference between the maximum unambiguous range of a distance measurement using a single pulsed frequency of 250 MHz and the maximum unambiguous range of a distance measurement using a single pulsed frequency of 266.6 MHz, divided by two. For example, the required precision corresponds to (0.6 m-0.5625 m)/2=~19 mm, which corresponds to 0.5*1 bin.

In addition, a precision of the distance measurement may depend on the bin width of the first or second histogram, the pulse width of the first or second pulsed signals, an optical power of the first or second pulsed signals or a timing jitter of a detector, which may be used to detect the reflected portions of the first and second pulsed signals. As such, the precision of the distance measurement can be considered as being independent of the first and second pulsed frequencies. Expressed differently, the precision of the distance measurement may be considered as constant and/or independent of the distance to the target. This means that the distance to the target can be measured until the reflected portions of the first and/or second signals become indistinguishable from ambient light.

Figure 3:
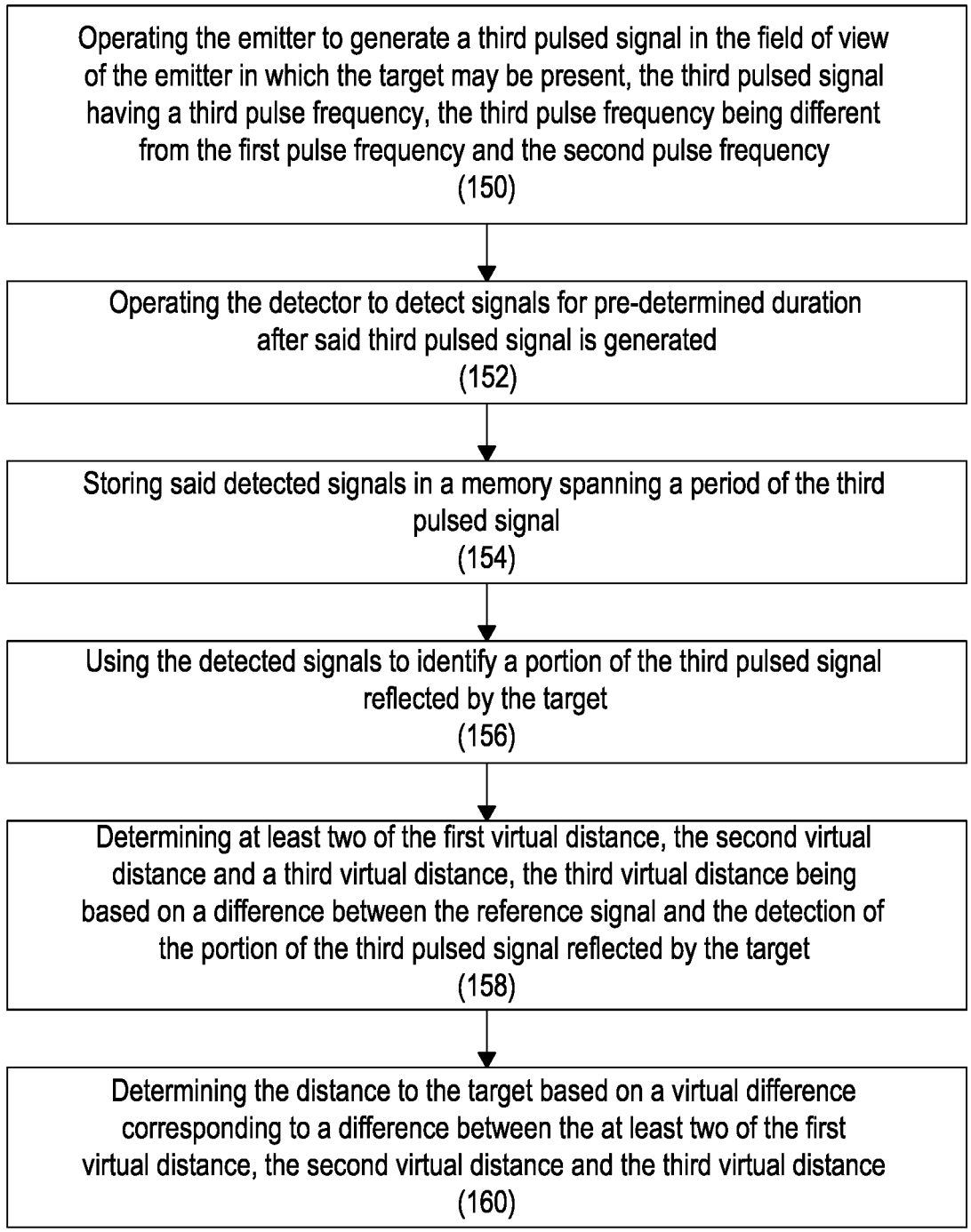
FIG. 3 shows a flow diagram outlining further steps that may be incorporated into the method of FIG. 1.

FIG. 3 shows a flow diagram outlining further steps that may form part of the method 100 of FIG. 1.

In step 150, the method 100 comprises operating the emitter to generate a third pulsed signal in the field of view of the emitter in which the target may be present. The third pulsed signal has a third pulse frequency f3. The third pulse frequency f3 is different from the first pulse frequency f1 and the second pulse frequency f2. For example, the third pulse frequency f3 may be larger or smaller than the first pulse frequency f1 and/or the second pulse frequency f2. The emitter may be operated to successively generate the first pulsed signal, the second pulsed signal and the third pulsed signal.

In step 152, the method 100 comprises operating the detector to detect signals for a pre-determined duration after said third pulsed signal is generated.

In step 154, the method 100 comprises storing said detected signals in a memory spanning a period of the third pulsed signal.

In step 156, the method 100 comprises using the detected signals to identify a portion of the third pulsed signal reflected by the target.

In step 158, the method 100 comprises determining at least two of the first virtual distance, the second virtual distance and a third virtual distance, the third virtual distance being based on a difference between the reference signal and the detection of the portion of the third pulsed signal reflected by the target.

In step 160, the method 100 comprises determining the distance to the target based on a virtual difference corresponding to a difference between the at least two of the first virtual distance, the second virtual distance and the third virtual distance.

The method steps shown in FIG. 3 will be described in more detail below with reference to FIGS. 4A to 4C.

Figure 4A:
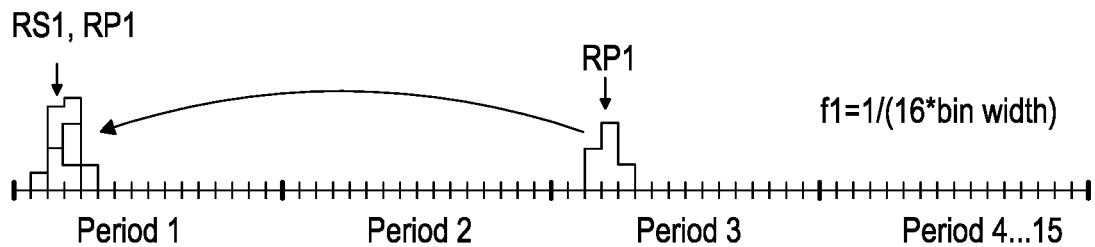
FIG. 4A shows a number of first histograms, each first histogram corresponding to a period of the first pulsed signal generated as part of the method of FIG. 3.
Figure 4B:
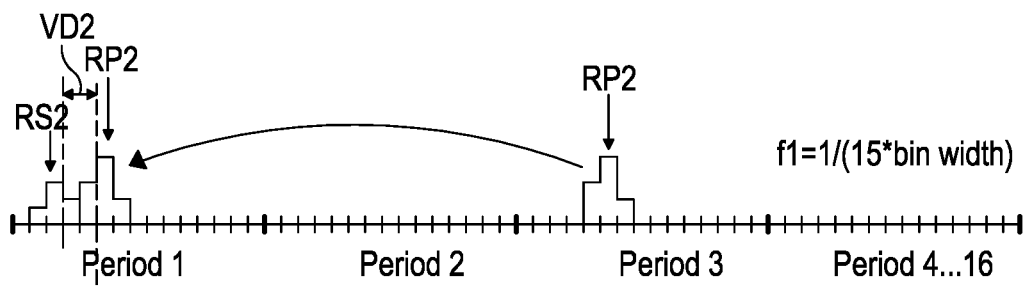
FIG. 4B shows a number of second histograms, each second histogram corresponding to a period of the second pulsed signal generated as part of the method of FIG. 3.
Figure 4C:
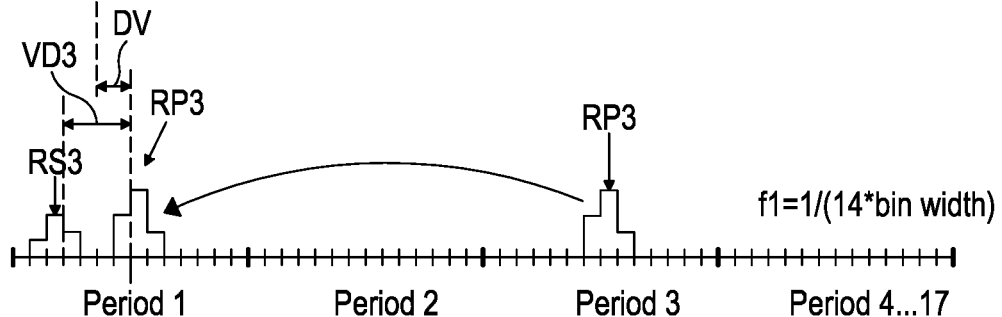
FIG. 4C shows a number of third histograms, each third histogram corresponding to a period of a third pulsed signal generated as part of the method of FIG. 3.

FIG. 4A shows a series of first histograms where each first histogram corresponds to a period of the first pulsed signal. FIG. 4B shows a series of second histograms, where each second histogram corresponds to a period of the second pulsed signal. FIG. 4C shows a series of third histograms, where each third histogram corresponds to a period of the third pulsed signal.

As described above, the first pulse frequency, the second pulse frequency and the third pulse frequency may be selected based on desired or required unambiguous range of the method 100 and/or on a size of the memory.

The third pulse frequency f3 may be higher than 100 to 200 MHz. The third frequency f3 may be in the range of about 100 to 350 MHz. In this embodiment, the third pulse frequency f3 is higher than the first and second pulse frequencies f1, f2. The first pulse frequency f1, the second pulse frequency f2 and the third pulse frequency f3 are selected such that there is a one bin difference between each of the period of the first pulsed signal, the period of the second pulsed signal and the period of the third pulsed signal. In this embodiment, the third pulse frequency is 307 MHz. It will be appreciated that in other embodiments, the third pulse frequency may be larger or smaller than 307 MHz. The first pulse frequency f1 is 250 MHz and the second pulse frequency is 266.6 MHz, as described above.

A pulse width of the third pulsed signal is the same as a pulse width of the first and second pulsed signals. For example, the pulse width of the first, second and third pulsed signals is in the range of 100 ps to 500 ps. It will be appreciated that in other embodiments the pulse width of the first pulsed signal, second pulsed signal and/or third pulse signal may be different.

In this embodiment, the bin width of each bin of each of the first, second and third histograms is 250 ps, which corresponds to 37.5 mm, as described above. This results in 16 bins per period of the first pulsed signal, 15 bins per period of the second pulsed signal and 14 bins per period of the third pulsed signal, as shown in FIGS. 4A to 4C.

The step of determining the distance to the target (step 160) comprises determining at least two of the first virtual distance, the second virtual distance and the third virtual distance.

The term "third virtual distance" may be considered as encompassing a third distance, which may or may not be the actual or correct distance to the target. This is because it can be uncertain as to which of the emitted pulses the detected portion of the third signal reflected by the target belongs to or is associated with. The third virtual distance therefore comprises a distance that is determined within a period of the third pulsed signal when the reflected portion is folded back into the recorded period, which is labelled as Period 1 in FIG. 4C. The reflected portion of the third pulsed signal is recorded in the third histograms as a peak RP3.

The step of determining at least two of the first virtual distance, the second virtual distance and the third virtual distance comprises selecting at least two of the first virtual distance, the second virtual distance and the third virtual distance to be determined. Expressed differently, the selection of two of the first virtual distance, the second virtual distance and the third virtual distance is based on a value (e.g. intensity) and/or profile (e.g. shape) of the first reference signal RS1 and/or the reflected portion of the first pulsed signal RP1, a value and/or profile of the second reference signal RS2 and/or the reflected portion of the second pulsed signal RP2 and/or a value and/or profile of a third reference signal RS3 and/or the reflected portion of the third pulsed signal.

The third reference signal RS3 comprises another portion of the third pulsed signal reflected by the cover portion, of the system or apparatus comprising the emitter. The method 100 in this example comprises detecting the third reference signal RS3 and the reflected portion of the third pulsed signal.

For example, in FIG. 4A, the peak of the reflected portion of the first pulsed signal RP1 overlaps or coincides with the peak of the first reference signal RS1 when RP1 is folded back into the period recorded in the memory. As such, it may be difficult or impossible to determine the first virtual distance. The overlap causes the intensity of the peak of the reflected portion of the first pulsed signal RP1 and the peak of the reference signal RS1 to change, e.g. increase, compared to an intensity of the peaks of the second and third reference signals RS2, RS3 and/or an intensity of the peaks of the reflected portions of the second and third pulsed signals RP2, RP3. The overlap also causes the shape of the peak of the reflected portion of the first pulsed signal RP1 and the peak of the reference signal RS1 to change compared to a shape of the peaks of the second and third reference signals RS2, RS3 and/or a shape of the peaks of the reflected portions of the second and third pulsed signals RP2, RP3.

The intensity and/or shape of the peak of the second and third reference signals RS2, RS3 are similar as they are not affected by the presence of the reflected portion of the second or third pulsed signals, respectively. Similarly, the intensity and/or shape of the peak of the reflected portion of the second and third pulsed signals RP2, RP3 is similar as they are not affected by the presence of the second and third reference signals, respectively, as shown in FIGS. 4B and 4C.

Due to the difference, e.g. the one bin difference, between each of the period of the first pulsed signal, the period of the second pulsed signal and the period of the third pulsed signal, the peaks of the reflected portions of the second and third pulsed signals RP2, RP3 are shifted relative to the peaks of the respective second and third reference signals RS2, RS3 by at least one bin. In this embodiment, the peak of the reflected portion of the second pulsed signal RP2 is shifted relative to the peak of the second reference signal RS2 by two bins and the peak of the reflected portion of the third pulsed signal RP3 is shifted relative to the peak of third reference signal RS3 by four bins, as shown in FIGS. 4B and 4C. Thus, the calculation of the second virtual distance and the third virtual distance is possible but not the first virtual distance, as such, in this embodiment, the second and the third virtual distances are selected.

The second virtual distance VD2 is determined by comparing the reflected portion of the second pulsed signal RP2 to the second reference signal RS2. The third virtual distance is determined by comparing the reflected portion of the third pulsed signal RP3 to the third reference signal RS3. For example, the second virtual distance VD2 can be determined from the difference between the peak of the second reference signal RS2 and the peak of the reflected portion of the second pulsed signal RP2. In the example shown in FIG. 4B, the second virtual distance VD2 is 2 bins, which corresponds to 0.075 m, e.g. two times the bin width of 37.5 mm.

The third virtual distance VD3 can be determined from the difference between the peak of the third reference signal RS3 and the peak of the reflected portion of the third pulsed signal RP3. In the example shown in FIG. 4C, the third virtual distance VD3 is 4 bins, which corresponds to 0.15 m, e.g. four times the bin width of 37.5 mm.

The step of determining the distance to the target (step 160) comprises determining a virtual difference corresponding to a difference between at least two of the first virtual distance, the second virtual distance and the third virtual distance.

The step of determining the distance (step 160) comprises determining the period difference between the period of the second pulsed signal and the period of the third pulsed signal. As described above, there is a one bin difference between each of the period of the first pulsed signal, the period of the second pulsed signal and the period of the third pulsed signal. In this embodiment, the period of the second pulsed signal is 3.75 ns, which corresponds to 0.5625 m or 15 bins. The period of the third pulsed signal is 3.26 ns, which corresponds to 0.525 m or 14 bins.

The distance to the target is determined based on the difference DV between the selected second virtual distance VD2 and third virtual distance VD3. As shown in FIGS. 4B and 4C, the difference between peaks RP2 and RP3 in Period 1 is two bins, which corresponds to the difference between the second and third virtual distances VD2, VD3. It will be appreciated that in other embodiments, the difference between the first and second virtual distances may be more or less two bins.

As before, the period difference DP is equivalent to one bin and the virtual difference DV is equivalent to two bins. The period weighting PW is the virtual difference DV divided by the period difference DP which, in this case, is two. Multiplying the period weighting PW by the period of the first or second pulsed signals determines the actual distance to add onto the first virtual distance VD1 or second virtual distance to determine the real distance to the target. In the present embodiment, the actual distance is in Period 3 in FIGS. 4B and 4C, which is equivalent to Period 1 plus two periods determined by the virtual difference DV of two bins. Using Equation 1 above, the distance R to the target can be calculated as 2*0.5625 m+2*37.5 mm=2*0.525 m+4*37.5 mm=1.2 m.

As such, the method steps described in relation to FIGS. 3, 4A, 4B and 4C allow for the elimination of mixing or interference between at least one of the first, second and third reference signals RS1, RS2, RS3 and at least one of the respective reflected portions of the first, second and third pulsed signals RP1, RP2, RP3.

It will be appreciated that in some embodiments, the emitter may be operated to generate the first pulsed signal, the second pulsed signal and the third pulsed signal only when the target is in the field of view of the emitter. For example, in use, the target may be located at the distance from the emitter, prior to generating the first pulsed signal, the second pulsed signal and the third pulsed signal. However, in other embodiments, the emitter may be operated to generate the first pulsed signal, the second pulsed signal and the third pulsed signal prior to the target being in the field of view of the emitter.

It will also be appreciated that the peaks, e.g. the bins, in the histograms associated with the first, second and third reference signals RS1, RS2, RS3 and/or the peaks, e.g. the bins, associated with the reflected portions of the first, second and third pulsed signals RP1, RP2, RP3 may be interpolated for the determination of the distances, e.g. virtual distances, described above, rather than using the bins with the maximum value/intensity.

Figure 5:
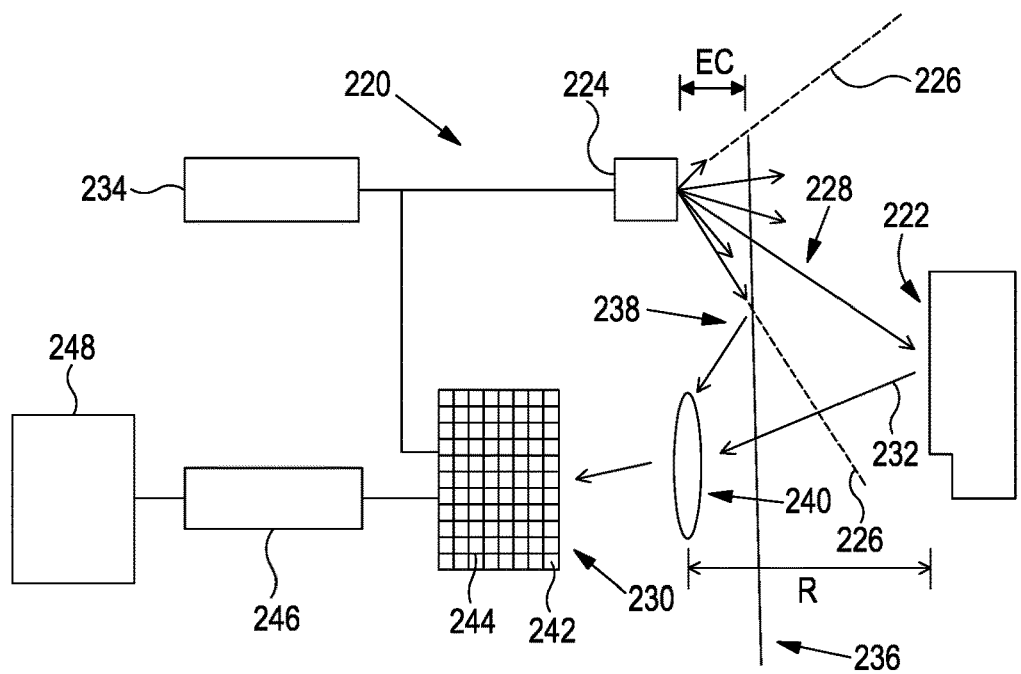
FIG. 5 shows a system for measuring a distance to a target in accordance with the present disclosure.

FIG. 5 shows a system 220 for measuring a distance R to a target 222 in accordance with the present disclosure. The system 220 is provided in the form of a direct Time-of-Flight (dToF) camera system. The system 220 comprises an emitter 224 having a field of view 226 (indicated by the dashed lines in FIG. 5). The emitter 224 is configured to generate a first pulsed signal and a second pulsed signal towards the target 222 in the field of view 226. The first pulsed signal and the second pulsed signal are indicated by reference numeral 228 in FIG. 5. The first pulsed signal comprises a first pulse frequency f1 and the second pulsed signal comprises a second pulse frequency f2. The first pulse frequency f1 is different from the second pulse frequency f2, as described above.

The emitter 224 may additionally be configured to generate a third pulsed signal towards the target 222 in the field of view 226. The third pulsed signal, which is also indicated by reference numeral 228, comprises a third pulse frequency f3. As described above, the third pulse frequency f3 is different from the first and second pulsed frequencies f1, f2.

The emitter 224 may be provided in the form of a pulsed light emitter or pulsed light emitter array, such as for example a pulsed laser diode, vertical cavity surface emitting laser (VCSEL), vertical cavity surface emitting laser (VCSEL) array or the like. The first pulsed signal, the second pulsed signal and the third pulsed signal 228 may comprise infrared radiation or light. For example, the emitter 224 may be configured to emit light or radiation having a wavelength in the range of about 900 nm to about 1.5 μm.

The system 220 comprises a detector 230 configured to detect a portion of the first pulsed signal reflected by the target 222 and a portion of the second pulsed signal reflected by the target 222. The detector 230 may additionally be configured to detect a portion of the third pulsed signal reflected by the target 222. The reflected portions of the first, second and third signals are indicated in FIG. 5 by reference numeral 232. The detector 30 may be provided in the form of a single photon avalanche diode (SPAD), Silicon photomultiplier or other high-speed detector.

The system 220 comprises a controller 234 configured to determine the distance R to the target 222 based on a first virtual distance and a second virtual distance as explained above.

The controller 234 may additionally be configured to determine a third virtual distance. As described above, in such embodiments, the controller 234 may configured to determine the distance to the target 222 based on at least two of the first virtual distance, the second virtual distance and the third virtual distance.

The controller 234 may be configured to control the emitter 224 and the detector 230. In other words, the controller 234 may be arranged to be in communication with the emitter 224 to control the emission of the first pulsed signal, the second pulsed signal and the third pulsed signal 228. In use, the controller 230 may operate the emitter 224 to scan the target, e.g. when the emitter 224 is provided in the form of the pulsed light emitter array. The controller 234 may be arranged to be in communication with the detector 230 to control the detection of the reflected portions of the first, second and third pulsed signals 232. In some embodiments, the controller 234 may be configured to synchronize the emission of the first, second and third pulsed signals 228 and the detection of the reflected portions of the first, second and third pulsed signals 232.

As shown in FIG. 5, the system 220 includes a cover portion 236, which may be provided in the form of a cover glass. The cover portion 36 is arranged in front of the emitter 224 and the detector 230. The cover portion 236 is arranged at a distance EC from the emitter 224. The cover portion 236 is arranged so that the reflected portions of the first, second and third pulsed signals pass through the cover portion 236 towards the detector 230. Another portion of the first, second and/or third pulsed signals, which is indicated by reference numeral 238 in FIG. 5, is reflected by the cover portion 236 and detected by the detector 230. The another reflected portions of the first, second and third pulsed signals are detected as the first reference signal RS1, the second reference signal RS2 and the third reference signal RS3, respectively, as described above.

The system 220 comprises an optical element 240. The optical element 240 is provided in the form of a lens or the like. The optical element 240 is arranged to direct and/or focus the reflected portions of the first, second and third pulsed signals 232 and the first, second and third reference signals 238 to or on the detector 230.

The system 220 may be used, for example, for two-dimensional or three-dimensional imaging or scanning, of the target 222. The detector 230 comprises an array of pixels 242. The array of pixels 242 may be provided in the form of a two-dimensional pixel matrix. In use, the distance R may be measured, e.g. simultaneously measured, for multiple pixels 244 or each individual pixel 244. Each pixel 244 in the array of pixels 242 is configured to detect the reflected portions of the first, second and third pulsed signals. As such, the distance R can be determined for multiple pixels 244 or each pixel 244, as described above. This may result in distance information corresponding to points on the target 222. The distance information can be used to convert a two-dimensional image of the target 222 into a three-dimensional image of the target 222. The system 220 comprises a further controller 246, in the form of an image processor. The further controller 246 is configured to convert the two-dimensional image of the target 222 into the three-dimensional image using the distance information. The system 220 comprises an output device 248, such as for example a display or screen, for displaying the three-dimensional image of the target 222.

In this embodiment, multiple pixels 244 of the array of pixels 242 share a memory for storing the first, second and third histograms. For example, an array of 2×2 pixels may share the same memory. The memory may be considered as being integrated or part of the array of pixels 242. The memory may comprise a size sufficient for storing a histogram spanning only a period of the first, second and third pulsed signals. The first, second and third pulse frequencies may be selected so that a size of the required memory is reduced and/or compatible with a required size of each pixel. As described above, by generating the first, second and third pulsed signals, the maximum unambiguous range is increased compared to a distance measurement using a single pulsed signal. This allows for use of higher first, second and third pulse frequencies compared to the distance measurement using a single pulsed signal. As such, the period of the first, second and third pulsed signals is reduced, which in turn allows for the size of the required memory to be reduced. This may make the memory compatible with the required size for each pixel, allowing for a reduced footprint of the system 220 and/or a reduction in the costs for producing the system 220.

Figure 6:
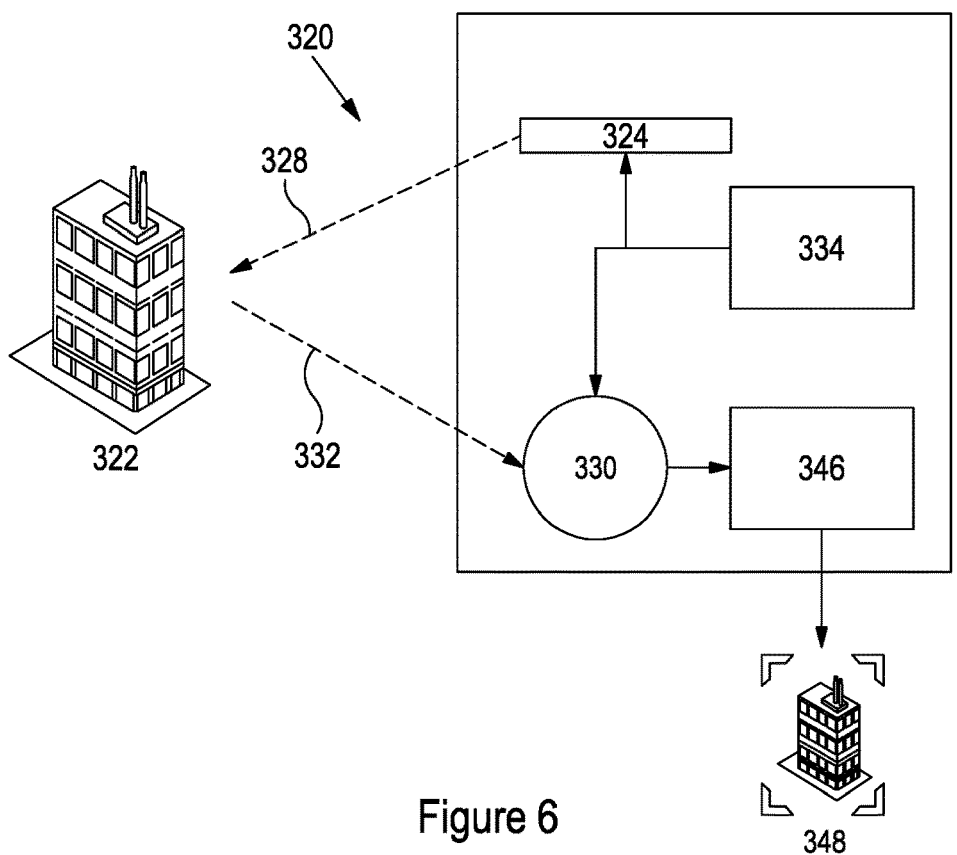
FIG. 6 shows another embodiment of a system for measuring a distance to a target in accordance with the present disclosure.

FIG. 6 shows another embodiment of a system for measuring a distance to a target in accordance with the present disclosure. The system shown in FIG. 6 is similar to the system shown in FIG. 5. As such, like features are indicated by like reference numerals incremented by 100.

As described above in relation to FIG. 5, the system 320 may be used for imaging or scanning, such as three-dimensional imaging or scanning, of a target 322. As shown in FIG. 6, the target 322 comprises a three-dimensional structure or object, such as for example a building. It will be appreciated that in other embodiments, the target may comprise other two-dimensional or three-dimensional structures or objects. The system 320 comprises an emitter 324, a controller 334, a detector 330 and an image processor 346. The three-dimensional image of the target 322 may be displayed by an output device 348.

Figure 7:
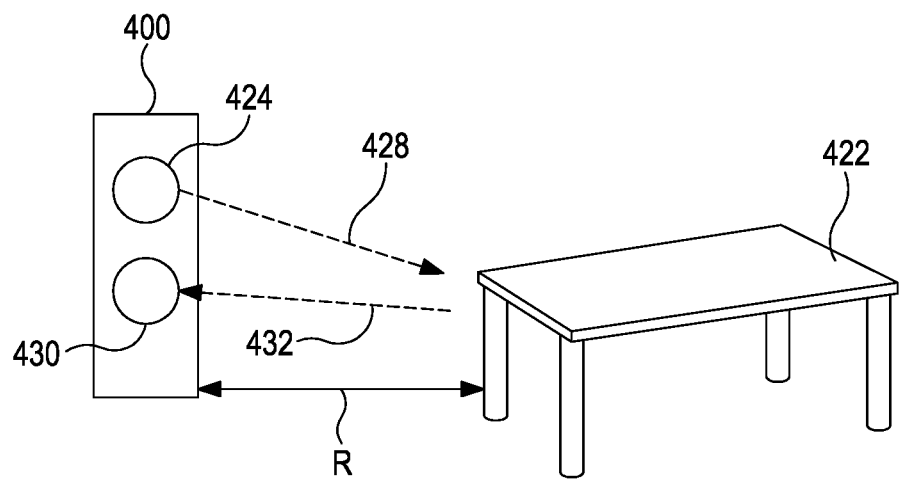
FIG. 7 shows an apparatus for obtaining data required to measure a distance to a target in accordance with the present disclosure.

FIG. 7 shows an apparatus 400 for obtaining data required to measure a distance to R a target 422 in accordance with the present disclosure. The apparatus 400 is provided in the form of a direct Time-of-Flight (dToF) sensor. The apparatus 400 comprises many of the features of the system 220 described above in relation to FIG. 5. As such, like features are indicated by like reference numerals incremented by 200.

However, it will be appreciated that the controller, further controller and output device shown in FIG. 5 are not part of the apparatus 400 and may be provided separately from the apparatus 400. For example, the controller, further controller and output device may be part of another device or system and/or may be provided remotely.

The apparatus 400 comprises an emitter 424. The emitter 424 may comprise any of the features of the emitter 424 described above in relation to FIG. 5.

The apparatus 400 comprises a detector 430. The detector 430 may comprise any of the features of the detector 430 described above in relation to FIG. 5. The detector 430 is configured to detect a portion 432 of the first pulsed signal 428 reflected by the target 422, a portion 432 of the second pulsed signal 428 reflected by the target 422 and a portion 432 of the third pulsed signal 428 reflected by the target 422, e.g. so as to allow the distance to the target 422 to be determined based on at least two of a first virtual distance, a second virtual distance and a third virtual distance.

The system 220, 320 and/or the apparatus 400 may be part of or integrated into another apparatus, device and/or system.

Figure 8:
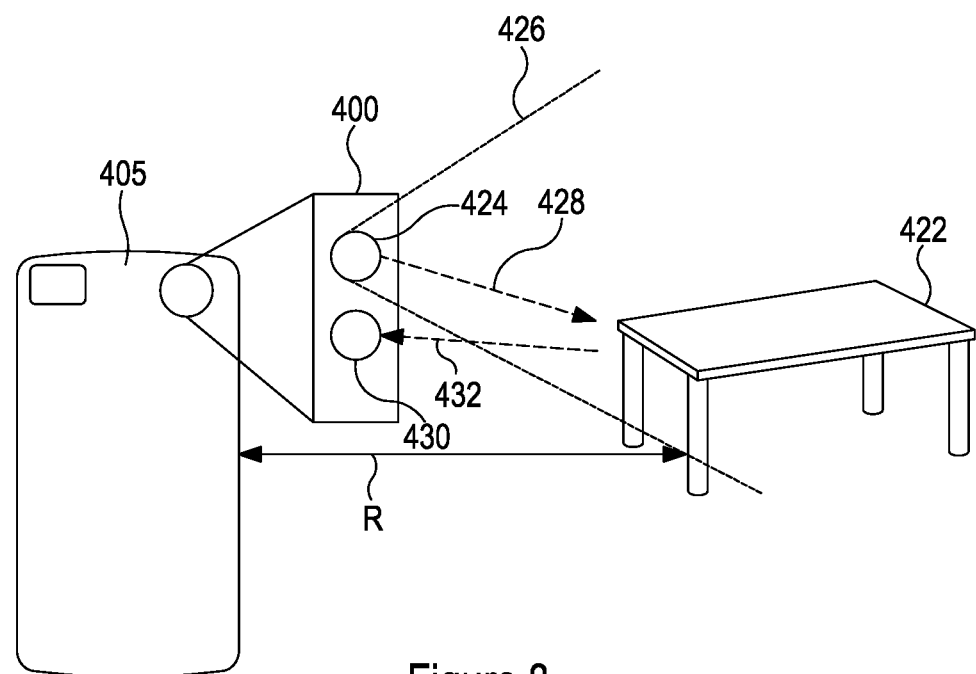
FIG. 8 shows an exemplary embodiment in which the apparatus of FIG. 7 is integrated into a mobile user device.

FIG. 8 shows an exemplary embodiment in which the apparatus 400 is part of or integrated into another device. The device is constituted by a mobile user device or handheld computing device or the like. In this embodiment the mobile user device is provided in the form of a smart phone 405.

In this embodiment, the controller, further controller and output device may be provided by one or more controllers (e.g. processors) and output devices of the smart phone 405. The apparatus 400 may be used for imaging or scanning, such as for example two-dimensional or three-dimensional imaging or scanning, of a target 422, as described above. In use, the smart phone 405 may be located at the distance R to the target 422, e.g. so that the target 422 is in the field of view 426 of the emitter 424, prior to operating the emitter 424 to generate the first, second and third pulsed signals 428, as described above.

Figure 9A:
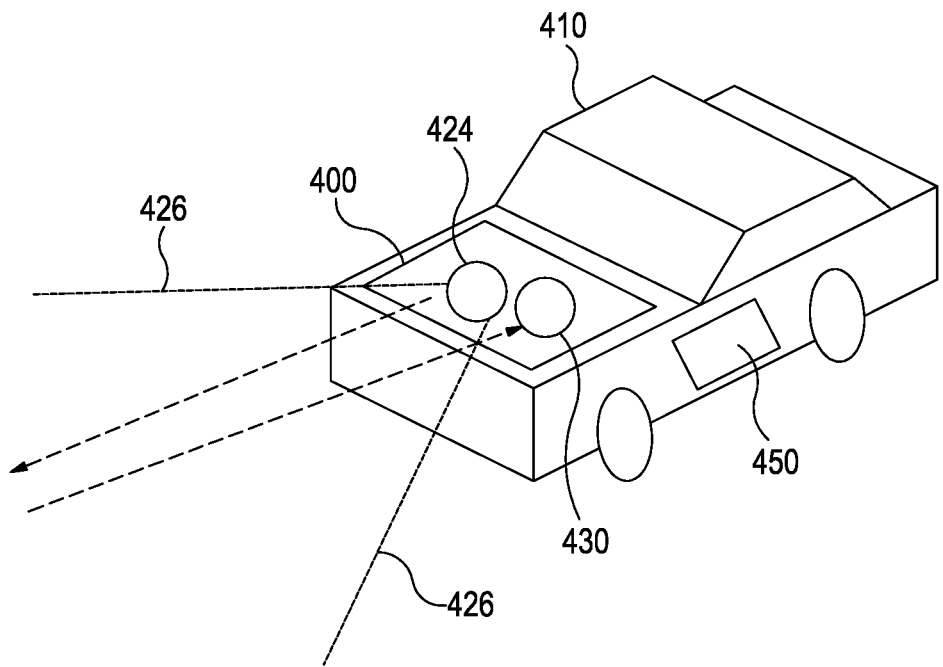
FIGS. 9A and 9B show another exemplary embodiment in which the apparatus of FIG. 7 is part of a motor vehicle.
Figure 9B:
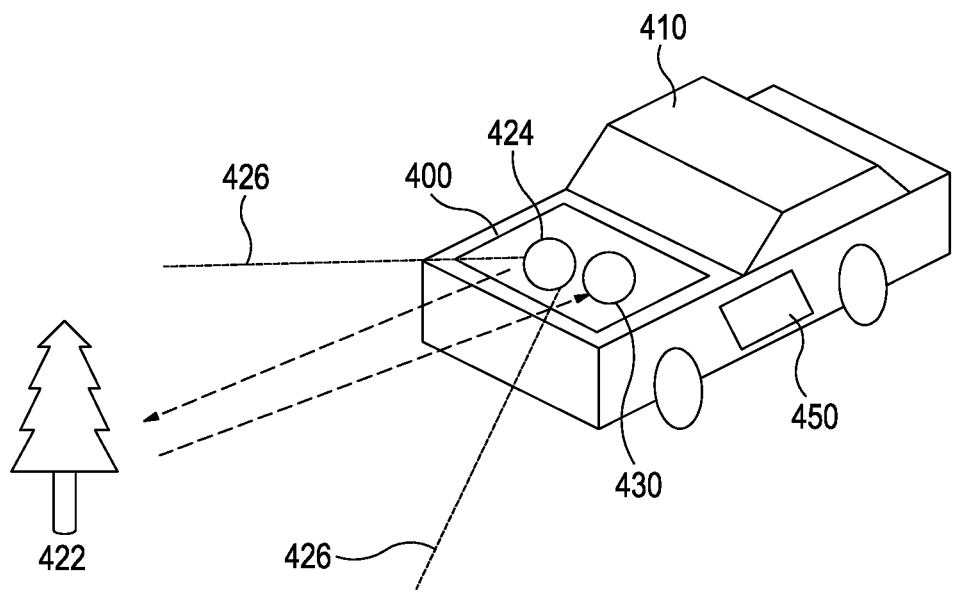

FIGS. 9A and 9B show another exemplary embodiment in which the apparatus 400 is part of another system. The system in this case is a motor vehicle 410, such as for example an autonomous vehicle. The apparatus 400 may form part of a Light Detection And Ranging (LIDAR) system of the motor vehicle 410.

As shown in FIG. 9A, in use, emitter 424 may generate the first pulsed signal, the second pulsed signal and the third pulsed signal 428 prior to the target 422 being in the field of view 426 of the emitter 424.

When the target 422 is in the field of view 426 of the emitter 424, e.g. in use, the detector 430 may detect a portion of the first pulsed signal reflected by the target 422, a portion of the second pulsed signal reflected by the target 422 and a portion of the third pulsed signal reflected by the target 422, as shown in FIG. 9B.

In this embodiment, the controller, further controller and output device are provided by one or more controllers and output devices 450 of the of the motor vehicle 410. However, it will be appreciated that in other embodiments, the controller, further controller and output device may be located remotely from the motor vehicle 410. In such embodiments, the apparatus 400 may be configured to communicate with the controller, further controller and output device via a communication module, e.g. wireless communication module, of the motor vehicle 410. The communications module may be configured to communicate over a cellular communications network, Wi-Fi, Bluetooth, ZigBee, near field communication (NFC), IR, satellite communication, other internet enabling network or the like.

The term "target" may be considered as encompassing an object, person, location and/or structure or the like.

It will be appreciated that the apparatus and/or system disclosed herein is not limited to being used for two-dimensional or three-dimensional imaging or scanning and/or being part of a mobile device or motor vehicle. For example, the systems and/or apparatuses disclosed herein may find applicability in or be integrated in a number of different apparatuses, devices or systems, such as for example in terrestrial, automotive, airborne and mobile industries.

LIST OF REFERENCE NUMERALS 100 method of measuring a distance
102-160 method steps
f1 first frequency
f2 second frequency
f3 third frequency
RS1 peak of the first reference signal
RS2 peak of the second reference signal
RS3 peak of the third reference signal
RP1 peak of the reflected portion of the first pulsed signal
RP2 peak of the reflected portion of the second pulsed signal
RP3 peak of the reflected portion of the third pulsed signal
DV virtual difference between first/second and second/third virtual distances
VD1 first virtual distance
VD2 second virtual distance
VD3 third virtual distance
220, 320 system for measuring a distance to a target
222, 322, 422 target
224, 324, 424 emitter
226, 426 field of view
228, 328, 428 first, second and third pulsed signal
230, 330, 430 detector
232, 332, 432 reflected portion of the first, second and third pulsed signal
234, 334 controller
236 cover portion
238 reflected other portion of the first, second and third pulsed signal
240 optical element
242 array of pixels
244 pixels
246 further controller
248, 348 output device
400 apparatus for obtaining data
405 smart phone
410 motor vehicle
450 controller, further controller and output device of the motor vehicle
EC distance between emitter and cover portion
R distance to the target Embodiments of the disclosure may also be implemented as instructions stored on a computer-readable medium, which may be read and executed by one or more processors. A computer-readable medium may include any mechanism for storing or transmitting information in a form readable by a machine (e.g., a computing device, which may be provided in the form of a user device). For example, a computer-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

To provide for interaction with a user, the disclosure can be implemented on a user device having a screen, e.g., a CRT (cathode ray tube), plasma, LED (light emitting diode) or LCD (liquid crystal display) monitor, for displaying information to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. A method for measuring a distance to a target, the method comprising:
   operating an emitter to generate a first pulsed signal and a second pulsed signal in a field of view of the emitter in which a target may be present, the first pulsed signal having a first pulse frequency and the second pulsed signal having a second pulse frequency, the first pulse frequency being different from the second pulse frequency;
   operating a detector to detect signals for a pre-determined duration after said first pulsed signal is generated and for a predetermined duration after said second pulsed signal is generated;
   storing said detected signals in a memory spanning a period of the first pulsed signal and a period of the second pulsed signal, respectively;
   using the detected signals to identify a portion of the first pulsed signal reflected by the target and a portion of the second pulsed signal reflected by the target;
   determining a first virtual distance based on a difference between a reference signal and the detection of the portion of the first pulsed signal reflected by the target;
   determining a second virtual distance based on a difference between the reference signal and the detection of the portion of the second pulsed signal reflected by the target; and
   determining the distance to the target based on a virtual difference corresponding to a difference between the first virtual distance and the second virtual distance,
   wherein the step of determining the distance to the target comprises determining a period difference corresponding to a difference between the period of the first pulsed signal and the period of the second pulsed signal.

2. The method according to claim 1, wherein the step of determining the distance to the target comprises determining a period weighting based on the virtual difference and the period difference, multiplying the period weighting by the period of the first pulsed signal and adding the first virtual distance.

3. The method according to claim 1, wherein the step of determining the distance to the target comprises determining a period weighting based on the virtual difference and the period difference, multiplying the period weighting by the period of the second pulsed signal and adding the second virtual distance.

4. The method according to claim 1, wherein the memory comprises a number of bins spanning the period of the first pulsed signal and the period of the second pulsed signal, respectively, and wherein each bin stores a value representing the detected signal detected in a pre-defined measurement window corresponding to a predefined distance or time.

5. The method according to claim 4, wherein the predefined measurement window of each bin corresponds to: the period difference; a fraction of the period difference; or a factor of the period difference.

6. The method according to claim 4, wherein the first virtual distance is determined by calculating the number of bins separating a reference bin comprising a detected signal corresponding to the reference signal and a signal bin comprising a detected signal corresponding to the portion of the first pulsed signal reflected by the target and the second virtual distance is determined by calculating the number of bins separating the reference bin comprising the detected signal corresponding to the reference signal and the signal bin comprising the detected signal corresponding to the portion of the second pulsed signal reflected by the target.

7. The method according to claim 1 comprising:
   operating the emitter to generate a third pulsed signal in the field of view of the emitter in which the target may be present, the third pulsed signal having a third pulse frequency, the third pulse frequency being different from the first pulse frequency and the second pulse frequency;
   operating the detector to detect signals for a pre-determined duration after said third pulsed signal is generated;
   storing said detected signals in a memory spanning a period of the third pulsed signal;
   using the detected signals to identify a portion of the third pulsed signal reflected by the target;
   determining at least two of the first virtual distance, the second virtual distance and a third virtual distance, the third virtual distance being based on a difference between the reference signal and the detection of the portion of the third pulsed signal reflected by the target; and
   determining the distance to the target based on a multiple virtual difference corresponding to a difference between the at least two of the first virtual distance, the second virtual distance and the third virtual distance.

8. The method according to claim 7, wherein the method comprises operating the emitter to successively generate the first pulsed signal, the second pulsed signal and the third pulsed signal.

9. The method of claim 7, wherein the step of determining at least two of the first virtual distance, the second virtual distance and the third virtual distance comprises selecting at least two of the first virtual distance, the second virtual distance and the third virtual distance based on one or more of:
   a value and/or profile of the detected signal corresponding to the reference signal;
   a value and/or profile of the detected signal corresponding to the portion of the first pulsed signal reflected by the target;
   a value and/or profile of the detected signal corresponding to the portion of the second pulsed signal reflected by the target; and
   a value and/or profile of the detected signal corresponding to the portion of the third pulsed signal reflected by the target.

10. The method according to claim 7, wherein the third virtual distance is determined by calculating a number of memory bins separating a reference bin comprising the detected signal corresponding to the reference signal and a signal bin comprising the detected signal corresponding to the portion of the third pulsed signal reflected by the target.

11. The method of claim 7, wherein the step of determining the distance to the target comprises determining a multiple period difference between at least two of the period of the first pulsed signal, the period of the second pulsed signal and the period of the third pulsed signal.

12. The method according to claim 11, wherein the step of determining the distance to the target comprises determining a period weighting based on the multiple virtual difference and the multiple period difference, and at least one of:
  multiplying the period weighting by the period of the first pulsed signal and adding the first virtual distance;
  multiplying the period weighting by the period of the second pulsed signal and adding the second virtual distance; and
  multiplying the period weighting by the period of the third pulsed signal and adding the third virtual distance.

13. The method according claim 1, wherein the reference signal is one of: an initiation signal; a synchronisation signal; a signal stored in a first memory bin; a cover glass reflectance; or a cross-talk signal.

14. A non-transitory computer readable medium comprising computer readable instructions configured to cause a processor to execute the method according to claim 1.

15. A memory comprising the computer readable instructions according to claim 14.

16. An apparatus for measuring a distance to a target, the apparatus comprising:
  an emitter having a field of view in which a target may be present, the emitter being configured to generate a first pulsed signal and a second pulsed signal in the field of view, the first pulsed signal having a first pulse frequency and the second pulsed signal having a second pulse frequency, the first pulse frequency being different from the second pulse frequency;
  a detector configured to detect signals for a pre-determined duration after said first pulsed signal is generated and for a predetermined duration after said second pulsed signal is generated; and
  a memory configured to store said detected signals, wherein the memory spans a period of the first pulsed signal and a period of the second pulsed signal, respectively; and
  a controller configured to:
    use the detected signals to identify a portion of the first pulsed signal reflected by the target and a portion of the second pulsed signal reflected by the target;
    determine a first virtual distance based on a difference between a reference signal and the detection of the portion of the first pulsed signal reflected by the target;
    determine a second virtual distance based on a difference between the reference signal and the detection of the portion of the second pulsed signal reflected by the target; and
    determine the distance to the target based on a virtual difference corresponding to a difference between the first virtual distance and the second virtual distance,
    wherein the controller configured to determine the distance to the target comprises the controller configured to determine a period difference corresponding to a difference between the period of the first pulsed signal and the period of the second pulsed signal.

17. The apparatus of claim 16, wherein the detector comprises an array of pixels, at least one or each pixel of the array of pixels being configured to detect signals corresponding to the portion of the first pulsed signal reflected by the target and/or the portion of the second pulsed signal reflected by the target.

18. The apparatus of claim 17, wherein the memory comprises a number of bins and each bin is shared by multiple pixels of the array of pixels.

19. The apparatus of claim 16 wherein the memory spans only the period of the first pulsed signal and/or only the period of the second pulsed signal, respectively.

* * * * *